(12) United States Patent
Truong et al.

(10) Patent No.: US 11,295,286 B2
(45) Date of Patent: Apr. 5, 2022

(54) MANAGING RETAIL POINT OF SALE DEVICES

(71) Applicant: Hewlett-Packard Development Company, L.P., Spring, TX (US)

(72) Inventors: Binh T Truong, Houston, TX (US); Quoc P Pham, Houston, TX (US); Amit Kumar Singh, Houston, TX (US); David Gosman, New York, NY (US); Suzanne Broussard, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,849

(22) PCT Filed: Jun. 20, 2017

(86) PCT No.: PCT/US2017/038291
§ 371 (c)(1),
(2) Date: Jul. 30, 2019

(87) PCT Pub. No.: WO2018/236350
PCT Pub. Date: Dec. 27, 2018

(65) Prior Publication Data
US 2020/0104816 A1    Apr. 2, 2020

(51) Int. Cl.
*G06Q 20/20* (2012.01)
*G06F 11/34* (2006.01)
*G07G 1/00* (2006.01)
*G07G 1/14* (2006.01)
*G06Q 20/12* (2012.01)

(52) U.S. Cl.
CPC .......... *G06Q 20/202* (2013.01); *G06F 11/34* (2013.01); *G06Q 20/12* (2013.01); *G07G 1/0009* (2013.01); *G07G 1/14* (2013.01)

(58) Field of Classification Search
CPC .... G06Q 20/202; G06Q 20/12; G07G 1/0009; G07G 1/14; G07F 11/34
See application file for complete search history.

(56) References Cited

U.S. PATENT DOCUMENTS

| | | | |
|---|---|---|---|
| 7,930,662 B1 * | 4/2011 | Sundararajan | G06F 30/3323 716/104 |
| 10,182,328 B1 * | 1/2019 | Maibach | G07G 3/00 |
| 10,613,962 B1 * | 4/2020 | Delange | G06F 11/3006 |

(Continued)

OTHER PUBLICATIONS

Bibi, Stamatia, Dimitrios Katsaros, and Panayiotis Bozanis. "Application development: Fly to the clouds or stay in-house?." 2010 19th IEEE International Workshops on Enabling Technologies: Infrastructures for Collaborative Enterprises. IEEE, 2010. (Year: 2010).*

(Continued)

*Primary Examiner* — Asfand M Sheikh
(74) *Attorney, Agent, or Firm* — Brooks Cameron & Huebsch PLLC (57) ABSTRACT

Example implementations relate to a retail point of sale (RPOS) device and cloud service. An example system can include an RPOS agent controller and a cloud service controller communicatively coupled to one another. The cloud service controller can provide a notification of a state of the RPOS device.

6 Claims, 4 Drawing Sheets

(56) References Cited

U.S. PATENT DOCUMENTS

| | | | |
|---|---|---|---|
| 2002/0078403 A1* | 6/2002 | Gullo | G06F 11/008 714/37 |
| 2003/0195653 A1* | 10/2003 | Lewis | F02D 41/2493 700/236 |
| 2003/0236970 A1* | 12/2003 | Palmer | G06F 8/65 713/1 |
| 2005/0006468 A1 | 1/2005 | Fandel et al. | |
| 2009/0037284 A1 | 2/2009 | Lewis et al. | |
| 2009/0037940 A1 | 2/2009 | Ng et al. | |
| 2011/0055029 A1 | 3/2011 | Nicolas | |
| 2014/0336791 A1 | 11/2014 | Asenjo et al. | |
| 2015/0010289 A1 | 1/2015 | Lindblom | |
| 2015/0026021 A1* | 1/2015 | Khan | G06Q 10/1091 705/30 |
| 2015/0138579 A1* | 5/2015 | Miyazaki | H04N 1/00029 358/1.13 |
| 2015/0199667 A1 | 7/2015 | Fernando et al. | |
| 2015/0200964 A1* | 7/2015 | Kariman | H04L 63/18 726/3 |
| 2016/0034362 A1* | 2/2016 | Al-Wahabi | G06F 11/1461 714/4.1 |
| 2016/0034876 A1 | 2/2016 | Speiser et al. | |
| 2017/0192840 A1* | 7/2017 | Jeansonne | H04L 1/0061 |

OTHER PUBLICATIONS

"Retail-Hardened Solutions from IBM" Oct. 2010.

* cited by examiner

MANAGING RETAIL POINT OF SALE DEVICES

BACKGROUND

A point of sale is a time and place a retail transaction is completed. A retail point of sale (RPOS) device is the device used to complete the transaction. An RPOS system can include a cash register including, for instance, a computer, monitor, cash drawer, receipt printer, customer display, card reader, and/or barcode scanner, among others.

DETAILED DESCRIPTION

RPOS devices can be connected to a plurality of peripheral devices that can enhance the retail experience for both the retailer and the purchaser. For instance, peripheral devices can include devices communicatively coupled to an RPOS device and works with the RPOS device. Example peripheral devices can include, for instance, cash drawers, keyboards, displays, card readers, receipt printers, scanners, scales, etc. These peripheral devices can include components (e.g., hardware and/or software components) that may fail over time.

RPOS device and peripheral device management can include monitoring, managing, and securing RPOS and peripheral devices. Such device management can allow for a retailer to deploy and support RPOS devices and their peripherals throughout the organization. Some approaches to RPOS and peripheral device management can include setting up and maintaining a backend server for management of the RPOS and peripheral devices, including, for instance, storage of inventory information, surveillance camera footage, configuration settings, etc.

Examples of the present disclosure can include cloud-based RPOS and peripheral device management system that can allow for a retailer to implement an RPOS infrastructure with an option to deploy software applications, drivers, and/or security settings; with an option to remotely control a client personal computer and/or backup database; and/or with an option to monitor and/or control an RPOS device without a backend server or server rack, resulting in reduced costs and maintenance as compared to other approaches, as well as increased turnaround rates to set up and deploy. These features, in some examples can be referred to as manageability settings or features. For instance, examples of the present disclosure can include a cloud-based RPOS and peripheral device management system that can provide to retailers options to store customer's proprietary independent software vendor (ISV) applications, software database (e.g., inventory, user account, pricing, etc.), store surveillance camera footage, configuration settings, restore data, and/or manageability settings to a secure cloud space where client personal computers (PCs) can access during online and offline states. In such an example, a RPOS device and/or its peripherals may not be interrupted while the cloud space is being accessed.

Examples of the present disclosure can also include providing notifications to users, managers, administrators, etc. regarding the status of RPOS devices and peripheral devices. For instance, these notifications can be sent suggesting proactive replacement of a device based on a determined mean time between failures (MTBE) of an RPOS device or peripheral device and/or an option to declare a custom input duration value for an RPOS device.

Figure 1:
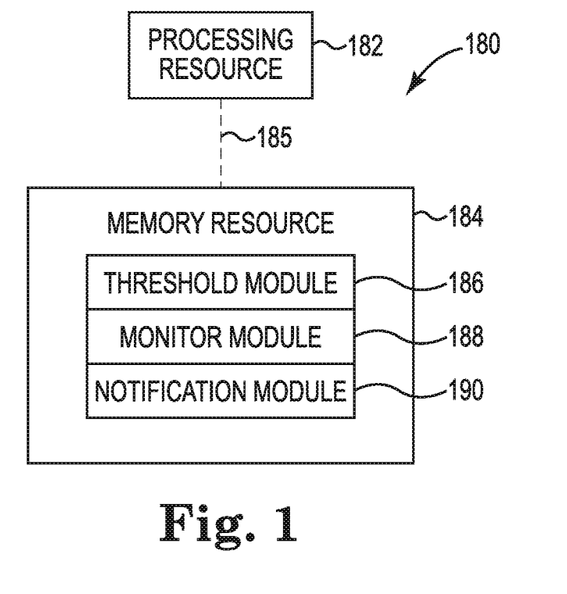
FIG. 1 illustrates a diagram of a computing system including a processing resource, a memory resource, and a number of modules according to an example.

FIG. 1 illustrates a diagram of a computing system 180 including a processing resource 182, a memory resource 184, and a number of modules 186, 188, 190, according to an example. The computing system 180 can utilize instructions (e.g., software and/or firmware) hardware, and/or logic to perform a number of functions including those described herein. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 182 can be implemented in a single device or distributed across multiple devices. The program instructions (e.g., machine-readable instructions (MRI)) can include instructions stored on the memory resource 184 and executable by the processing resource 182 to implement a desired function (e.g., providing restore data, providing notifications, etc.).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 186, 188, 190 can include MRI that when executed by the processing resource 182 can perform a number of functions including those described herein. The number of modules 186, 188, 190 can be sub-modules of other modules. For example, the threshold module 186 and the monitor module 188 can be sub-modules and/or contained within the same computing system. In another example, the number of modules 186, 188, 190 can comprise individual modules at separate and distinct locations (e.g., MRM, etc.).

Each of the number of modules 186, 188, 190 can include instructions that when executed by the processing resource 182 can function as a corresponding engine. For example, the threshold module 186 can include instructions that when executed by the processing resource 182 can function as a threshold engine. Similar, each of the number of modules 188, 190 can include instructions that when executed by the processing resource 182 can function as engines.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 186, 188, 190 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

In an example, threshold module 186 can include instructions that when executed by the processing resource 182 can cause computing system 180 to determine a threshold MTBF for an RPOS peripheral device. For instance, a threshold MTBF can be set for a peripheral device based on information gathered with respect to a lifespan of the peripheral device. Information may be gathered about previous interactions with the peripheral device or other same or similar peripheral devices. Based on when those peripheral devices (or components thereof) failed, a threshold MTBF can be determined. This can be used as a baseline for when a retailer may want to replace or repair the peripheral device, for instance. This analytical can be reported to a cloud service for analysis, in some examples. Using information available in the cloud service, a determination can be made as to what the lifespan of a particular peripheral device may be, and a threshold MTBF can be determined as a preventative measure against device failure. For instance, a peripheral device can be replaced or repaired before this threshold is reached.

Monitor module 188 can include instructions that when executed by the processing resource 182 can cause computing system 180 to near-continuously monitor firmware data associated with the RPOS peripheral device to determine the RPOS peripheral device's MTBF. As used herein, "near-continuous" can include without meaningful breaks in the monitoring. For example operational circumstances can cause intermittent gaps in monitoring (due to equipment failure, etc.), and "near-continuous monitoring" should be read to include monitoring with intermittent or periodic gaps, whether planned or unplanned as well as records without intermittent or periodic gaps, thus including "continuous monitoring," For simplicity, the term "near-continuous" and "near-continuously" will be used herein and do not exclude "continuous" or "continuously."

The determined MTBF can be compared to the threshold MTBF when making replace and/or repair decisions. Depending on the peripheral device, the MTBF determination can be based on a collected or received report of an amount of hours a peripheral device has been running, a collected or received report of a number of receipt printer paper cuts accumulated throughout the peripheral device's life cycle, and/or a collected or received report of a number of card swipes and insertions the peripheral device has had in its life cycle. For instance, monitor module 188 can include instructions executable to make calls to firmware associated with the RPOS peripheral device to collect the firmware data, store the firmware data locally to the RPOS device, and upload the firmware data to a cloud service. The firmware data can include unified point of sale (UPOS) manageability data and/or peripheral device-specific data such as a number of good scans and/or a number of bad scans for a printer, a number of print lines a printer print on a cut, etc. Calls can be made to the firmware to check the data, the data can be stored at the RPOS device, and the data can be pushed to the cloud service to create a report of the data.

In some examples, near-continuously monitoring the firmware data can include security monitoring. For instance, the peripheral devices and/or the RPOS device can be monitored for security issues such as a cash drawer device being dropped, a handheld scanner being disconnected, a foreign thumb drive being inserted, a cash drawer accessed after hours, a peripheral device disconnecting from power, etc. These issues can be identified to a retailer via notification module 190. In some examples, the notification of an issue can be provided in real time.

Notification module 190 can include instructions that when executed by the processing resource 182 can cause computing system 180 to send a notification of an exceeded threshold, in response to the RPOS peripheral device's determined MTBF exceeding the determined threshold. For instance, when a peripheral device exceeds the determined MTBF threshold, the retailer, an administrator, the RPOS device, etc. can receive a notification that the peripheral device and/or a component of the peripheral device may fail within a certain time period. In some examples, notification module 190 can include instructions executable to send the notification of the exceeded threshold to users associated with a local configuration file via a mail server and/or to users associated with a cloud service via an upload to the cloud service. For instance, the configuration file can be located somewhere that does not update remotely from the cloud service; rather it can be updated locally and stored locally on a hard drive, for example.

Put another way, in an example in which the RPOS device and/or the peripheral device are not connected to a cloud service, a local database may receive and/or store the notification. In an example in which the RPOS device and/or peripheral device is connected to the cloud service, the retailer may be able to receive the notification, and receive suggestions on how to repair or replace the peripheral device, as well as having options to do so in response to the notification. For example, if a retailer receives a notification that a scanner peripheral device's MTBF has exceeded the determined threshold MTBF, the retailer may be prompted with a replacement scanner or parts for replacement.

Alternatively, if the retailer has chosen a particular setting, a replacement scanner may be sent in response to a threshold MTBF being exceeded. Put another way, a retailer can be offered options to proactively replace or repair peripheral devices before they fail based on the threshold MTBF. In some examples, a notification may be sent before the threshold is exceeded. For instance, the notification may be provided when the threshold is nearing. In some examples, the notification can be provided in real time. Updates from the cloud service may be performed automatically. Automatically updating, as used herein, can include updating with limited or no user input and/or with limited or no prompting.

Figure 2:
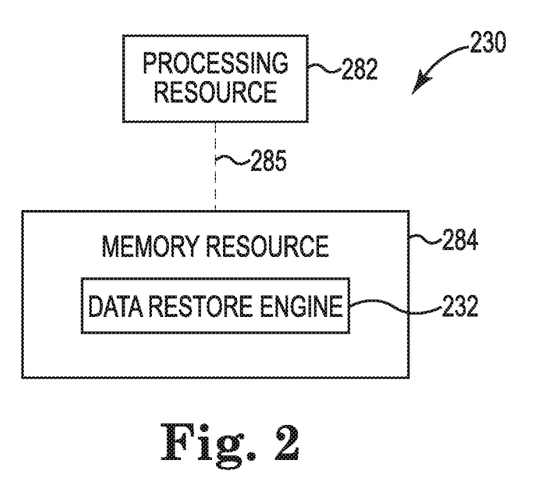
FIG. 2 illustrates a diagram of a controller including a processing resource, a memory resource, and an engine according to an example.

FIG. 2 illustrates a diagram of an example controller 230 including a processing resource 282, a memory resource 284, and a data restore engine 232 according to an example. For example, the controller 230 can be a combination of hardware and instructions for providing restore data and/or providing notifications, among others. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., providing restore data, providing notifications, etc.). The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes an engine (e.g., data restore engine 232). The memory resource 284 can include more engines than illustrated to perform the various functions described herein.

The engine can include a combination of hardware and instructions to perform a number of functions described herein (e.g., providing restore data, providing notifications, etc.). The instructions (e.g., software, firmware, etc.) can be downloaded and stored in a memory resource (e.g., MRM) as well as a hard-wired program (e.g., logic), among other possibilities.

Figure 3:
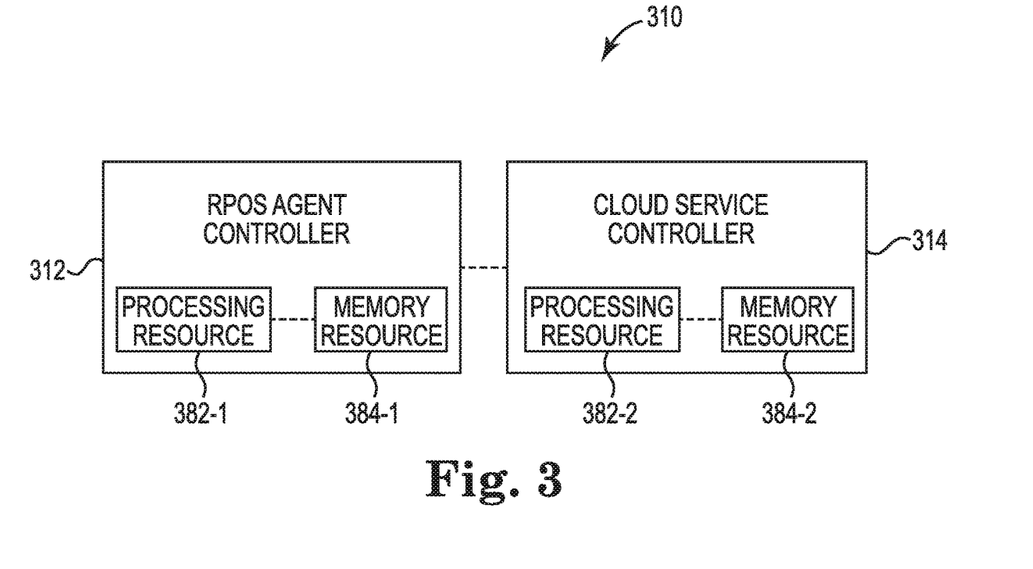
FIG. 3 illustrates a diagram of a system including an RPOS agent controller and a cloud service controller.

FIG. 3 illustrates a diagram of a system 310 including an RPOS agent controller 312 and a cloud service controller 314. RPOS agent controller 312 and cloud service controller 314 can be communicatively coupled to one another. As used herein, communicatively coupled can include coupled via various wired and/or wireless connections between controllers such that data can be transferred in various directions between the controllers. RPOS agent controller 312 can be a controller similar or the same as controller 230 as described with respect to FIG. 2. Similar, cloud service controller 314 can be a controller similar or the same as controller 230 as described with respect to FIG. 2.

For instance, RPOS agent controller 312 can include a processing resource 382-1 in communication with a memory resource 384-1 including executable instructions to perform particular functions (e.g., providing restore data, providing notifications, etc.). Similar, cloud service controller 314 can include a processing resource 382-2 in communication with a memory resource 384-2 including executable instructions to perform particular functions (e.g., providing restore data, providing notifications, etc.). In some examples, processing resources 382-1 and 382-2 can be different processors or the same processor. Additionally, in some examples, memory resources 384-1 and 384-2 can be different memory resources or the same memory resource (e.g., a shared memory resource).

RPOS agent controller 312, in some examples, can include instructions executable to determine a threshold MTBF for a plurality of RPOS peripheral devices associated with an RPOS device and monitor a state of the RPOS device and a state of each of the plurality of RPOS peripheral devices by collecting retail-specific manageability data associated with the RPOS device and the plurality of RPOS devices. For instance, RPOS agent controller 312 based on information available to the RPOS agent controller 312, for instance from a cloud service, it can be determined what a particular peripheral device is, as well as when it may fail, be in need of replacement, and/or be in need of repair. Options can be available to a retailer via the RPOS agent controller 312 to set the MTBF threshold based on peripheral device power usage and/or peripheral device use frequency, and based on the MTBF threshold settings, notifications can be send from the RPOS agent or cloud service of the device state, as will be discussed further herein.

The RPOS agent controller 312, in some examples, can include instructions executable to detect tampering with the RPOS device, and in response, provide a different notification. For instance, upon determining the RPOS device (or an associate peripheral device) has been tampered with (e.g., foreign USB memory stick inserted, communication disconnected, power disconnected, etc.), a notification can be sent to a retailer, information technology (IT) administrator, etc. In some instances, this notification can be automatic.

In some examples, RPOS agent controller 312 can include instructions executable to monitor a state of the RPOS device and its peripheral devices by collecting retail-specific manageability data by placing calls, for instance for UPOS manageability information, to directly access each peripheral device's firmware data. Other data collected from using management instrumentation (e.g., Windows management instrumentation (WMI)) events can also be collected for manageability. In some examples, RPOS agent controller 312 can include instructions executable to feed retail-specific manageability data to the cloud service to analyze the data and manage each peripheral device.

Put another way, using UPOS specifications, RPOS agent controller 312 can collect a peripheral device's firmware state, firmware counter (e.g., hour count of an RPOS or peripheral device's power up, good scan/bad scan count, print line count, print knife cut count, etc.). In such an example, the peripheral devices include firmware supporting manageability data, such as UPOS manageability data. In some instance, the RPOS agent controller 312 can include logic based on a configuration file that can trigger a notification and the MTBF threshold setting. In an example, a peripheral device threshold setting can be based on 10%+/− MTBF value and/or it can be manually entered. For example, if a particular peripheral device has an MTBF value of two years, after two years of usage, a threshold warning may be triggered, and a notification can be sent.

In such an example, the notification can be sent locally or via a cloud services. For instance, a local notification can include checking configuration file settings and using a mail server to send a notification to members assigned based on the configuration file. A cloud services-based notification can include the use of a cloud service to log the notification and upload the event to the cloud back end to manage the database and sent out notifications to users assigned. For instance, users may be spread over different retailers and have different RPOS and peripheral devices. In an example where, the MTBF is not met and/or exceeded, monitoring continues.

Cloud service controller 314, in some examples, can include instructions executable to analyze the collected retail-specific manageability data using the MTBFs and provide a notification of the state of the RPOS device and the state of each of the plurality of RPOS devices based on the analysis. As used herein, the state of a device (RPOS or peripheral) can include how the device is operating, its MTBF, memory errors, hard drive errors, graphics errors, and/or other information about the performance of the device. Errors can include, for instance, failures, malfunctions, loss of power, etc. Based on the MTBFs, it can be determined how near to failure a device may be. A state notification can include a notification about the current state of the device, including, for instance, if the device needs repair or replacement, and/or if the device is in an operation state. In some examples, the RPOS agent controller 312 can also include instructions executable to provide a notification of the state of the RPOS device and each of the plurality of RPOS peripheral devices based on the analysis.

In some examples, the cloud service controller can include instructions executable to update the RPOS device based on the analysis and/or update each of the plurality of RPOS peripheral devices based on the analysis. For instance, if, during analysis, it is determined that firmware or software of the RPOS device or peripheral devices are due for updates, the cloud service controller can execute instructions to update the devices. This can be performed manually, periodically, or automatically, for instance. In some examples, if a device or device component fails, the cloud service controller can include instructions to order a replacement. This can be performed manually, periodically, or automatically, for instance.

In some examples, the cloud service controller can include instructions executable to store online and offline data associated with the RPOS device and the plurality of RPOS peripheral devices. For instance, a retailer can access a cloud service associated with the cloud service controller and manipulate data associated with the retailer in an online or offline mode. When the cloud service controller detects a network connection, the data can be automatically synchronized with the cloud service.

In such an example, synchronizing retailer data, which can be secured or unsecured data, with the cloud service can provide a path for a retailer to store on the cloud execution files, retail database information (e.g., inventory, account access, etc.), surveillance camera video data, restore data, operating system factory images, custom images, checkpoint data, configuration files, and/or manageability data, among others. In some examples, the synchronization can allow for a path to access secured cloud data from a bootable drive. In such an example, restore data such as an image or checkpoint data can be restored to a hard drive of an RPOS or peripheral device from the cloud upon failure of the hard drive or device.

In some examples, system 310 can be part of a cloud-based management solution for retailers. For instance, a retailer may subscribe to the cloud-based management solution and sign into the system for access to the RPOS agent controller and cloud service controller. For instance, a plurality of retailers may utilize the cloud-based management solution. In some examples, the cloud-based management solution may include the RPOS agent controller 312, the cloud service controller 314, or both controllers. For instance, a retailer may use the RPOS agent controller 312 in conjunction with their own cloud service or may use the cloud service controller 314 without the use of the RPOS agent controller 312.

System 310, for instance via cloud service controller 314 can push different settings to different devices at different retailers, with the different settings being tailored to particular RPOS and/or peripheral devices. Settings, for instance, can include manageability settings, hardware settings, and/or software settings, among others.

Figure 4:
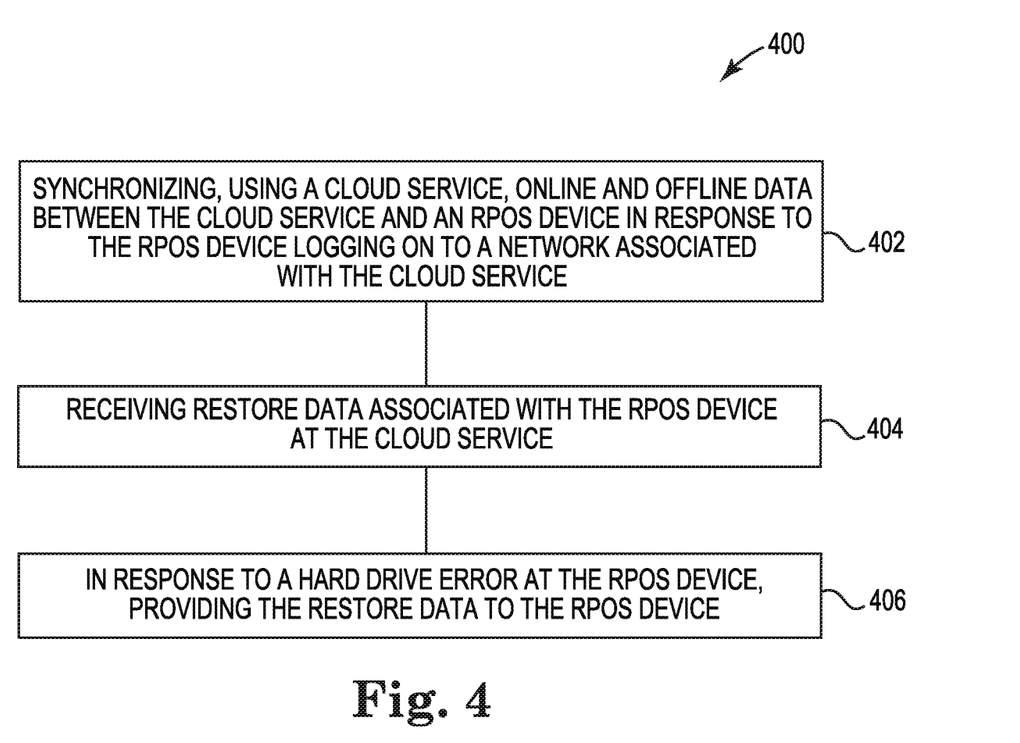
FIG. 4 illustrates a diagram of a method for restoring data according to an example.

FIG. 4 illustrates a diagram of a method 400 for restoring data according to an example. At 402, method 400 can include synchronizing, using a cloud service, online and offline data between the cloud service and an RPOS device in response to the RPOS device logging on to a network associated with the cloud service. For instance, a user can manipulate data while in online or offline mode, and upon detection of a network, the data can be synchronized. At 404, method 400 can include receiving restore data associated with the RPOS device at the cloud service. For instance, the synchronized data received can include restore image data and/or receiving restore checkpoint data. In such an example, a user can utilize the cloud service to store this restore data.

Method 400, at 406, can include providing the restore data to the RPOS device in response to a hard drive error at the RPOS device. For instance, if a hard drive of the RPOS device, or an associated peripheral device fails, restore data can be retrieved from the cloud service. For instance, access to the cloud service can be provided via a bootable drive. A user can log into the cloud service remotely, gather restore data via a thumb drive or other storage medium from the cloud, and restore the hard drive. The restore data can include, for instance retail-specific data associated with the RPOS device and can be securely stored in the cloud.

For instance, in some embodiments, a network of RPOS devices and peripherals can include a plurality of RPOS and peripheral devices each having a link to the cloud to save restore image or restore checkpoint data and synchronize online and offline data between shared data on the cloud and data with the RPOS device based a most recent modification.

In an example using a bootable drive, an application can be installed on an RPOS device or peripheral device supporting a bootable drive to allow security authentication and access to cloud data. Bootable drive support can allow a user to boot to removable memory to recover the restore image or access restore data for image recovery. In some examples, the cloud service can automatically detect the RPOS device, and map the restore image from cloud storage to the RPOS device based on a unit serial number and/or system management basic input/output system (SMBIOS) table matching.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A system comprising:
    a retail point of sale (RPOS) agent controller comprising a processing resource in communication with a memory resource including instructions executable to:
        determine a threshold mean time between failures (MTBF) for each one of a plurality of RPOS peripheral devices associated with an RPOS device,
            wherein the instructions executable to determine the MTBF comprise the instructions executable to:
                determine what each one of the plurality of RPOS peripheral devices is, determine a failure estimation of each one of the plurality of RPOS peripheral devices, determine a replacement status of each one of the plurality of RPOS peripheral devices, and determine a repair status of each one of the plurality of RPOS peripheral devices; and
                receive instructions to set the MTBF threshold based on power usage associated with the plurality of peripheral devices, use frequency of the plurality of peripheral devices, or both;
        monitor a state of the RPOS device and a state of each of the plurality of RPOS peripheral devices by collecting retail-specific manageability data associated with the RPOS device and the plurality of peripheral RPOS devices by making calls to firmware associated with each one of the plurality of RPOS peripheral devices to collect firmware data, store the firmware data locally to the memory resource of the RPOS agent controller, and upload the firmware data to a cloud service; and
    a cloud service controller of the cloud service communicatively coupled to the RPOS agent controller and comprising a processing resource in communication with a memory resource including instructions executable to:
        analyze the collected retail-specific manageability data using the threshold MTBFs and the monitored state of the RPOS device and the state of each of the plurality of RPOS peripheral device; and
        provide a notification of the state of the RPOS device and the state of each of the plurality of RPOS peripheral devices based on the analysis.

2. The system of claim 1, the cloud service controller to update the RPOS device based on the analysis.

3. The system of claim 1, the cloud service controller to update each of the plurality of RPOS peripheral devices based on the analysis.

4. The system of claim 1, the cloud service controller to store online and offline data associated with the RPOS device and the plurality of RPOS peripheral devices.

5. The system of claim 1, the RPOS agent controller to:
    near-continuously monitor the firmware data to detect tampering with the RPOS device; and
    in response, provide a different notification.

6. The system of claim 1, further comprising the instructions executable to:
    determine the MTBF based on previous interactions with each one of the plurality of RPOS peripheral devices including when failures of the plurality of RPOS peripheral devices occurred, when failures of components of the plurality of RPOS peripheral devices occurred, or both; and
    upload the MTBFs to the cloud service via the cloud service controller.

* * * * *